Figure 1:
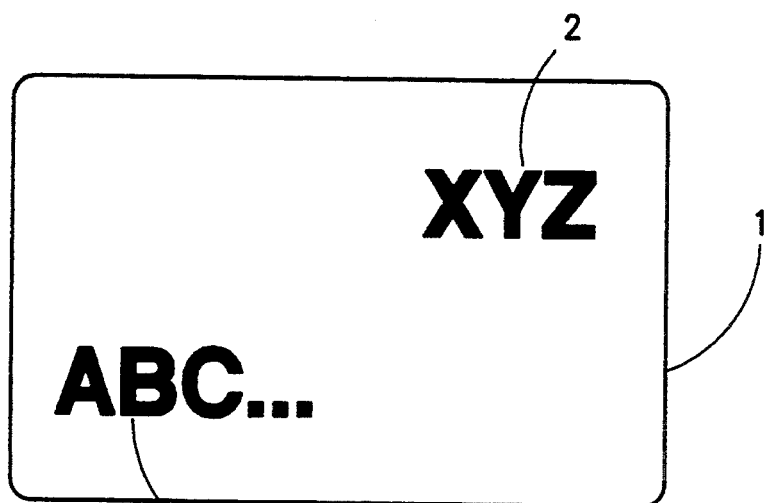

United States Patent [19]

Heckenkamp et al.

[11] Patent Number: 5,433,807
[45] Date of Patent: Jul. 18, 1995

[54] METHOD OF PRODUCING A DOCUMENT WITH AN UNFORGEABLE SURFACE RELIEF

[75] Inventors: Christoph Heckenkamp; Gerhard Stenzel, both of Munich; Wittich Kaule, Emmering, all of Germany

[73] Assignee: GAO Gesellschaft fur Automation und Organisation m.b.H., Munich, Germany

[21] Appl. No.: 85,258

[22] Filed: Jul. 2, 1993

Related U.S. Application Data

[60] Continuation of Ser. No. 606,306, Oct. 31, 1990, abandoned, which is a division of Ser. No. 276,198, Nov. 25, 1988, Pat. No. 4,988,126.

[30] Foreign Application Priority Data

Dec. 4, 1987 [DE] Germany .................. 37 41 179.9

[51] Int. Cl.⁶ .................................. B32B 31/00
[52] U.S. Cl. ..................... 156/230; 235/491; 283/91; 283/92; 156/234
[58] Field of Search ............... 156/230, 233, 234, 240; 235/468, 491; 283/91, 92, 904

[56] References Cited

U.S. PATENT DOCUMENTS

| | | | |
|---|---|---|---|
| 3,340,121 | 12/1963 | Lawrenz | 156/233 |
| 3,363,346 | 1/1968 | Wittboldt | 283/85 |
| 3,577,917 | 5/1971 | Nantz | 101/269 |
| 3,663,278 | 5/1972 | Blose et al. | 427/146 X |
| 3,831,008 | 8/1974 | Bradshaw | 235/61.11 H |
| 3,917,925 | 11/1975 | del Rio | 235/448 |
| 4,153,494 | 5/1979 | Vilaprinyo Oliva | 156/230 |
| 4,294,650 | 10/1981 | Werthmann | 156/235 X |
| 4,500,116 | 2/1985 | Ferro et al. | 283/92 |
| 4,507,346 | 3/1985 | Mauer | 283/904 X |
| 4,527,051 | 7/1985 | Stenzel | 235/380 |
| 4,597,592 | 7/1986 | Maurer et al. | 283/75 |
| 4,597,593 | 7/1986 | Maurer | 283/904 X |
| 4,773,677 | 9/1988 | Plasse | 156/293 X |

FOREIGN PATENT DOCUMENTS

| | | |
|---|---|---|
| 995274 | 8/1976 | Canada . |
| 0149542 | 7/1985 | European Pat. Off. ............ 283/904 |
| 3314244A1 | 10/1984 | Germany . |
| 3440653A1 | 3/1985 | Germany . |
| 3409761A1 | 9/1985 | Germany . |

*Primary Examiner*—James J. Engel
*Attorney, Agent, or Firm*—Bacon & Thomas

[57] ABSTRACT

Documents and data, patterns, etc., applied thereto, which are present in the form of a surface relief, in particular in the form of embossed characters, are provided partially in the area of this surface relief with luminescent substance which is testable visibly and by machine. The luminescent substance is introduced either into raised or into depressed areas of the surface relief, so that characteristic features of the surface relief are reflected in its spatial distribution. The data can thus be tested for falsification and at the same time for authenticity in a simple way.

10 Claims, 4 Drawing Sheets

METHOD OF PRODUCING A DOCUMENT WITH AN UNFORGEABLE SURFACE RELIEF

This application is a Continuation of application Ser. No. 07/606,306, filed Oct. 31, 1990 now abandoned, which is a Divisional application of Ser. No. 07/276,198, filed Nov. 25, 1988, now U.S. Pat. No. 4,988,126, issued Jan. 29, 1991.

The present invention relates to a document with a surface relief having elevated and/or depressed areas relative to the surface of the document, and to a method for producing such documents.

Such documents are, for example, papers of value, bank notes, certificates and identity cards. The latter are used as credit cards, bank cards, cash cards, entitlement cards or the like in a great variety of areas, including e.g. cashless payments, access control systems and a great variety of service systems. These identity cards generally have data relating to the card owner which are applied during the so-called personalization process. A widespread way of applying these data is the embossing method, by which the individual characters are embossed by mechanical dies that deform the card material (German patent no. 14 86 810). One distinguishes between "high embossed data," which are embossed from the back of the card and exist in the form of raised areas on the front of the card and "deep embossed data," which are embossed from the front of the card to the back. Deep embossed characters therefore exist in the form of depressed areas in the front of the card. To improve the visibility of the individual characters, one additionally inks the apex areas (high embossing) or depressed areas (deep embossing) with a color, usually black, that contrasts clearly with the surroundings.

The particular advantage of these embossed card data is that the data existing in relief can at the same time be used as a printing block. When the card is used later, the data can thus be easily transferred to the current voucher. The transfer is effected in "imprinter devices" into which the card and the voucher are inserted for the user data to be reproduced on the voucher via a mechanical embossing process using carbon paper or flimsy (German patent no. 20 18 927). An international standard fixes not only the position of the embossed data on the identity card but also the form and the relief height thereof (ISO Standard 7811/1).

It has become apparent worldwide for some time that this way of representing the user-related data of an identity card, that is financially advantageous in terms of both production and subsequent practical use, has the serious disadvantage that these data are relatively poorly protected against attempted forgery. Since the card materials are generally thermoplastics, in particular PVC, the embossed data can be ironed flat relatively easily and the cards reembossed with different data. The original inking can generally be removed using commercially available solvents and a forged card reinked with a different data set using commercial inks. Original cards, i.e. cards that are "authentic" in terms of their structure and getup, can thus be provided with false user data with fraudulent intent quite easily without this being recognizable or testable by outsiders.

In order to counteract this easy forgeability and limit the resulting financial losses, there have been many proposals for solving this problem.

Some of these proposals aim at replacing mechanical high embossing by other methods for producing irreversible relief structures.

For example, German laid-open print no. 22 28 290 discloses a method by which the embossed data only appear on one surface of the card. In this method, the personalization data are engraved into metal plates and transferred to the surface of the identity card during lamination of the card. During the laminating process the card material softens and flows into the depressions in the metal plate without leaving any negative relief on the back. This gives rise to characters that can also be used as a printing block but can no longer be embossed back and changed in the conventional way.

However, this type of embossing is much more elaborate since a metal plate with the particular engraved personalization data must be produced for each card and this personalization process is a method step that cannot be separated from the card production.

Only German laid-open print no. 32 18 315 presents an identity card whose character set to be used as a printing block can not only be provided in a simple way, but is also present in an especially unforgeable form. The known method proposes providing the identity card with a foamable plastics layer containing appropriate foaming agents and then foaming this layer locally to form the desired characters in a relief structure. One preferably uses a laser beam which generates in the foamable plastics material the heat necessary for triggering the foaming process or activating the foaming agents. By appropriately selecting the plastics material, foaming agent and laser parameters, such as intensity, etc., one can conduct this foaming process selectively to produce characters that conform to the standard in terms of their dimensions and relief height. At the same time, this foaming can involve a discoloration of the plastics material, so that one can dispense with the inking operation. Since the discoloration exists within the plastics material itself and is furthermore irreversible, it is unforgeable and also resistant to abrasion.

Although a high degree of protection against forgery is reached by the known card, its production involves providing foamable film layers which cannot readily be used unchanged for commonly time-tested layer structures.

According to another method (German laid-open print no. 34 09 761), one applies to the outer surface of an identity card an additional layer whose thickness corresponds to the required relief height of the data. One then forms the characters by locally removing the material of this additional layer using a laser beam.

This method also requires the use of special layers which must show both good removability and good adhesive properties.

Other known methods aim at protecting the embossed data produced by conventional methods against falsification by taking additional measures.

For example, German patent no. 32 48 784 discloses a method for applying a second data set identical to the embossed data set to the card material in an irreversible form by means of a laser beam. By directly comparing the embossed data set with the second invariable data set, one can detect the correctness of the embossed data without any auxiliary means. According to another embodiment (German patent no. 33 14 327) one places over the embossed data—also by means of a laser—a security pattern, e.g. a line pattern, which has typical inhomogeneities corresponding to the embossed characters due to the surface structure and the resulting change in the recording conditions. In particular after a back-embossing, the original data are clearly recognizable due to this inhomogeneity in the line pattern.

Both methods attain a high degree of protection against forgery, but they require the use of a laser. Furthermore, these protective measures are more suitable for visual testing and less suitable for machine testing.

It is also known (German laid-open print no. 34 40 658) to additionally apply thermosensitive substances to identity cards to be provided with embossed characters. Since a forger usually heats and thereby softens the card material to make it easier to reverse the embossed structure, thermosensitive substances which change their color at temperatures within the range of the softening temperatures make such attempted forgery visible. An essential disadvantage of this method is that these temperatures at which the thermosensitive substances change their color must not be reached during production of the identity cards either. This makes it impossible to use the conventional methods of producing identity cards which involving pressing the individual card layers together under the effects of heat and pressure. Furthermore, this known card is not protected against cold working, i.e. a reversal without simultaneous heating. Finally, the card also fails to meet the usual requirements in terms of temperature resistance and will already show discoloration, for example, in strong sunlight or if stored carelessly, e.g. in the vicinity of sources of heat. This may unfairly cast a suspicion of manipulation on the owner of the card.

Finally, German laid-open print no. 33 14 244 discloses various methods of protecting embossed data from forgery which consist in particular in removing layer material chemically or mechanically in the apex areas of the embossed characters, thereby exposing a deeper layer contrasting with the surroundings. Another measure consists in introducing into the identity card a layer provided with microcapsules that contain chromogenic substances. During mechanical embossing these substances are simultaneously released and produce a corresponding invariable discoloration in the interior of the card.

The present invention is based on the problem of providing a document bearing a surface relief, in particular in the form of embossed characters, that is easy and inexpensive to produce and allows for easy and reliable testing of both the document and the data applied thereto as to their authenticity and originality to protect the data against falsification. Another goal is to provide methods for producing such documents.

This problem is solved by the features stated in the characterizing part of the independent claims. Advantageous developments are the subject of the subclaims.

A feature of the present invention is that relief structures of a document, such as the embossed characters of an identity card to be used as a printing block, are provided with at least one luminescent substance in such a way that the authenticity of the document and the correctness of the data can be ascertained by testing the presence, the spatial distribution and the properties of the luminescent substance(s) in terms of excitation and emission. One therefore preferably uses luminescent substances not accessible to the general public. The substances can optionally also be used in a mixture of various luminescent and nonluminescent substances that can only be analyzed using considerable technical resources. The areas to be marked are preferably the apex areas, in the case of high embossed characters, and the bottoms of the depressions representing the characters, in the case of deep embossed characters.

Although the use of luminescent substances for protecting papers of value is known from a number of publications and, on the other hand the problem of protecting embossed data from forgery has existed for a long time, the prior art stated above shows that solutions for protecting embossed characters were always sought elsewhere.

Only the invention provides a solution of surprising simplicity for protecting embossed characters from forgery, without any need for changing the process technology of the conventional production of embossed characters in any way, as shall be explained in more detail below.

This solution also makes it possible to check not only whether the embossed data are falsified (no or incomplete luminescence) but also, at the same time, whether they are authentic. The latter is done by testing the specific and characteristic properties of the particular luminescent substances used. The tests directed to the various aspects can be performed visually or by machine, depending on which luminescent substances are used for protection.

Furthermore, it is also possible to provide reliable protection against forgery for embossed structures on papers of value, such as the blind embossed characters, patterns, signets, etc. always present on shares.

The characters provided with luminescent substances are also most suitable for machine reading, since the use of corresponding filters can minimize disturbances from surrounding light so that one obtains high contrast in the read signal, i.e. a good signal-to-noise ratio. The invention thus offers a simple solution for machine reading of user-related data and their further processing, transmission, etc., in the desired form. The elaborate and trouble-prone, usually mechanical scanning of high embossed characters as known up to now (German patent no. 24 06 354, U.S. Pat. No. 3,917,925) can thus be avoided in a simple manner.

Furthermore, a signal differing from card to card can be obtained from a data line of a high embossed data set provided with luminescent substance, for example by an integral scanning of the entire data line or parts thereof. Such signals can then be used in the known manner (German patent no. 28 58 266) to detect the individual authenticity of documents.

Not only embossed characters but also virtually any relief structures, even randomly arising relief structures, can be machine read in a simple manner if the highly raised areas are provided with luminescent substance. By the indirect means of measuring the local distribution of the emission of the luminescent substance, one can thus ascertain striking places in a surface relief using relatively simple means. A relief structure introduced more or less randomly into the surface of a document such as an identity card, or a randomly arising relief such as surface granulation, can be used to obtain such individual signals by detecting the luminescent image by machine, processing it and depositing it as an authenticity characteristic e.g. in a magnetic stripe or an electronic memory of an identity card. In a subsequent verification operation the luminescent or relief image is scanned and the data obtained therefrom checked for similarity with the stored data.

In a preferred embodiment, the luminescent substance is transferred to the raised areas of a document by the so-called hot embossing method, i.e. via a transfer band. In this hot embossing method, a transfer band is coated with the substances to be applied to the document, whereby the band optionally bears both a visually contrasting color and the luminescent substance. It is thus possible, in one operation, to apply several substances simultaneously and fix them there, e.g. with the aid of an additional adhesive layer. The luminescent substance(s) and the layer of contrasting color can be present in one layer in the form of a mixture, or else in two or more superjacent and adjacent layers. One preferably selects an arrangement in which the transferred luminescent substances form the outer layer of the card, to prevent the excitation radiation and emission from being disturbed by the layer of color.

This transfer method is also particularly suitable for applying one or more luminescent substances, preferably in the form of a multicolor luminescent pattern, to relief structures on the surface of a paper carrier, such as a share, bank note, etc., which are produced e.g. by steel intaglio printing. It is also particularly advantageous, for example, to use sublimable colors and luminescent substances, since after evaporation by diffusion or migration they penetrate into the plastics material and are thus fixed and not removable from the document without destroying it.

Figure 2:
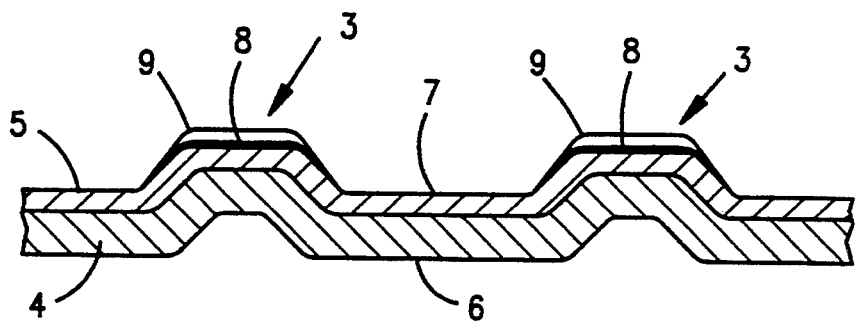
Figure 3:
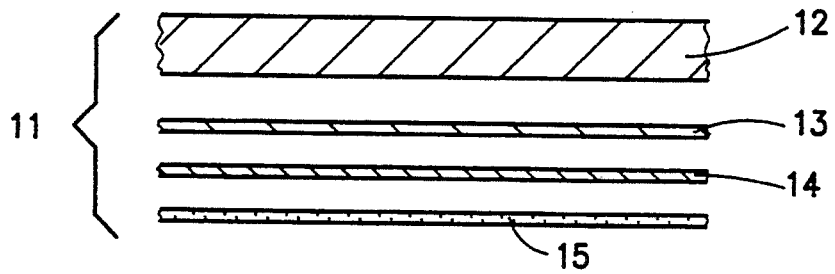
Figure 4:
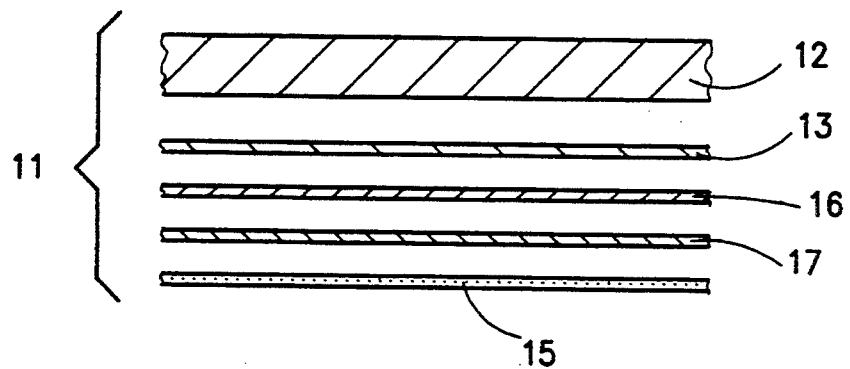
Figure 3A:
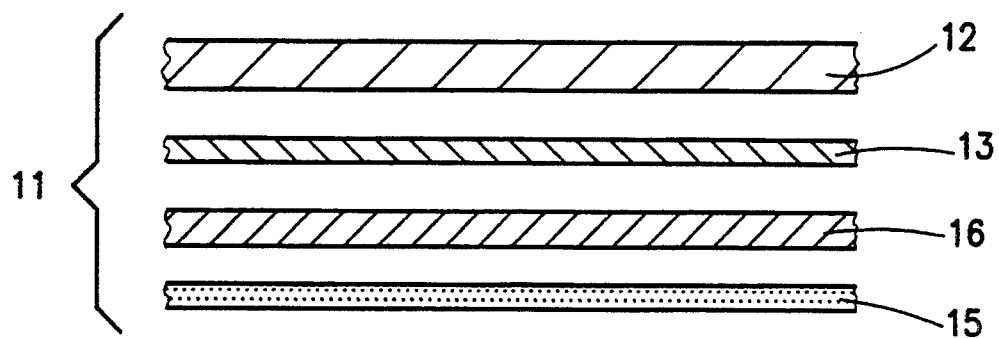
Figure 3B:
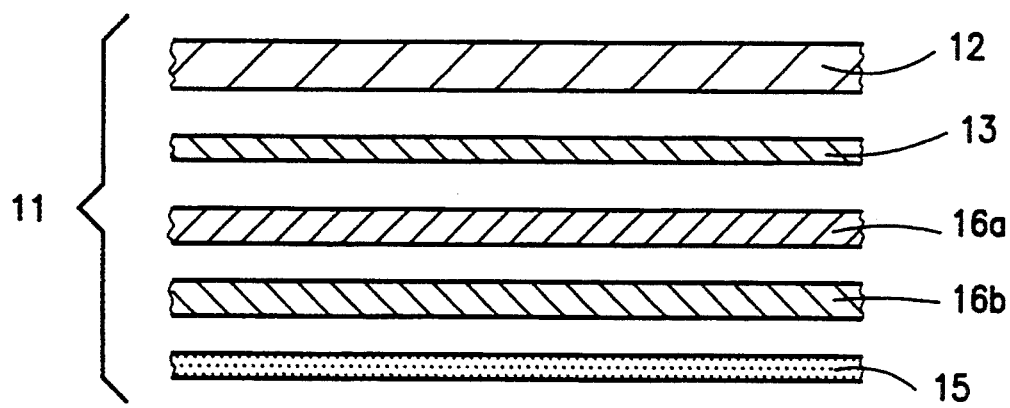
Figure 4A:
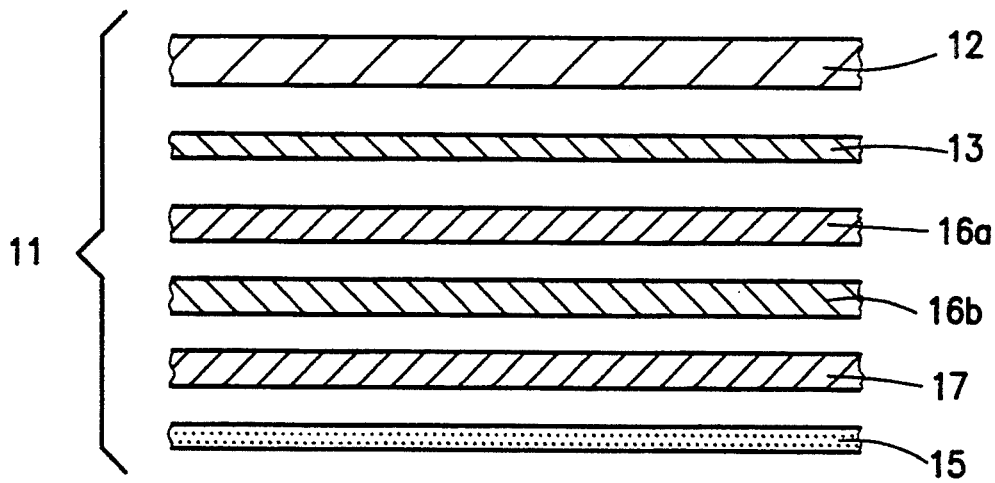
Figure 5:
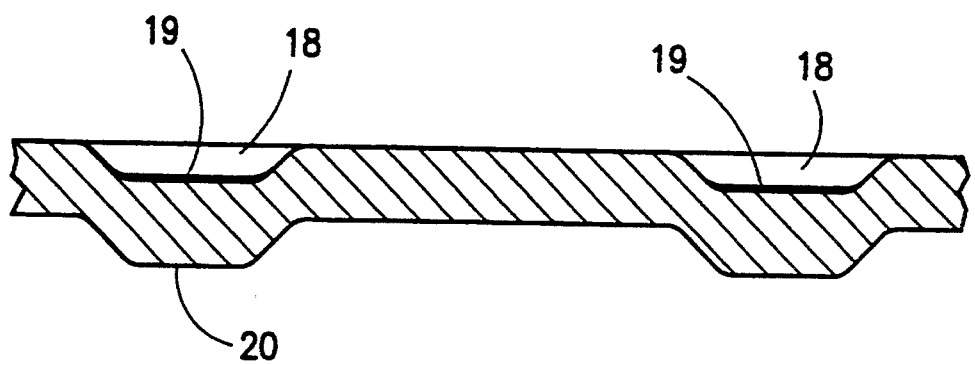
Figure 6:
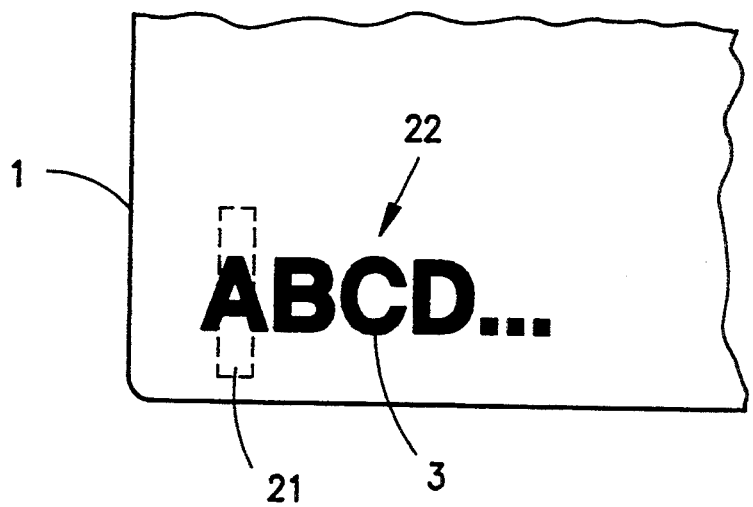
Figure 7:
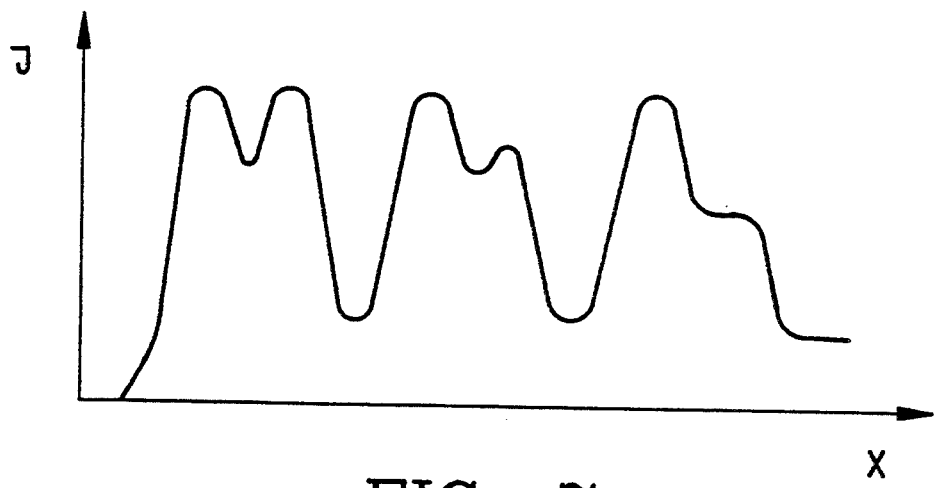

Further advantages, in particular advantageous developments, are the object of the description of the inventive subject with reference to the figures, in which FIG. 1 shows an identity card from the front, FIG. 2 shows a sectional view of this card, FIGS. 3 and 4 show various embodiments of a transfer band, FIG. 5 shows the sectional view of an identity card with deep embossed characters, FIG. 6 shows a portion of an identity card with a schematic view of the sensor head of the scanning means, FIG. 7 shows a signal obtained during scanning.

Figure 8:
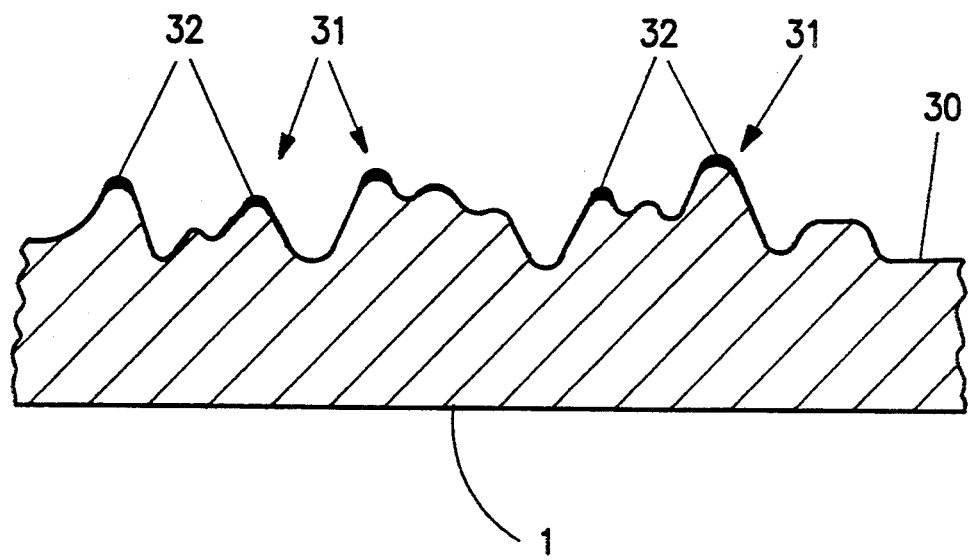
Figure 9:
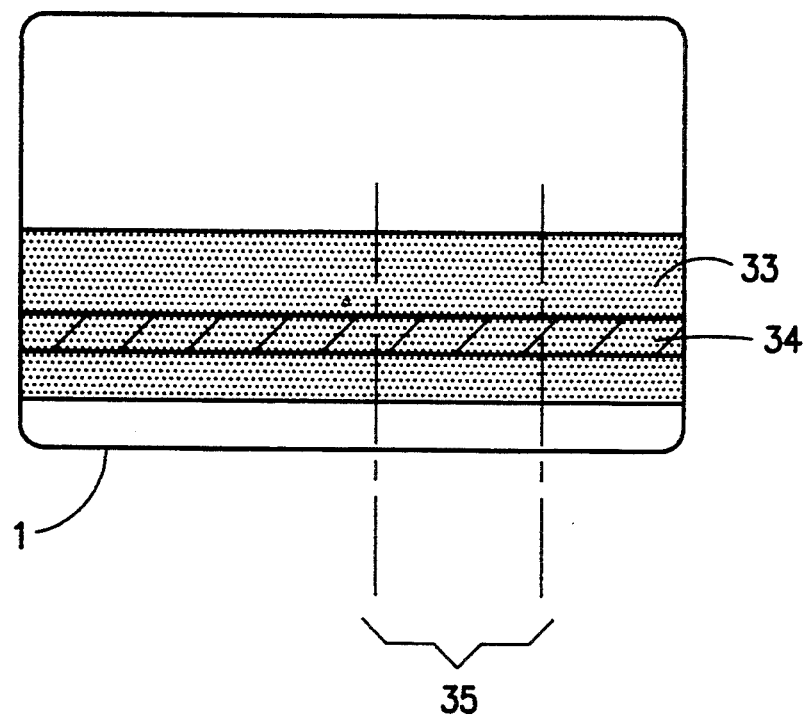

FIGS. 8 and 9 show further embodiments of the invention.

FIGS. 1 and 2 show, as an example of a document, an identity card 1 with the typical information content. This includes e.g. statement 2 of the issuing credit institute, which is applied e.g. by printing technology to card inlay 4. The card inlay is preferably covered on one or both sides by a transparent cover film 5. Finally, the card bears user-related data 3 which are applied to the card in a relief form that can be used as a printing block. In the case of high embossing, the characters are embossed from back 6 of the card to front 7, so that they appear in the form of elevations on the front of the card. In the case of deep embossing, the characters are embossed from the front of the card toward the back, so that they appear in the form of depressions on the front of the card (FIG. 5). The embossed characters are made more visible by being inked with contrasting, usually black, gold or silver color 8 (or 19 in FIG. 5).

These relief structures are now provided additionally with luminescent substance in the apex areas or the bottoms. This luminescent substance can be directly mixed into color 8 for inking the embossed characters or applied as separate layer 9. If the apex areas of the surface relief is to be inked, it is advisable to use the known hot embossing method, by which the layers to be provided on the card are first applied to a carrier band and then transferred from this band to the card using pressure and heat. Due to the relief structure of the card, the layers of the carrier band are only transferred to those areas which come in close contact with the band, i.e. in this case only the raised areas of the surface relief.

FIG. 3 shows such a transfer band 11 the layers being represented for the sake of clarity at some distance apart and not true to scale. Carrier band 12 is preferably a mechanically very stable and thermostable plastics band, the preferred material being polyester. A layer of varnish 13 is applied to this carrier band, later forming an outer cover layer of the card and protecting the layers therebelow, such as adjacent layer of color 14, from abrasion and mechanical stress. Above-mentioned layer of color 14 contains the colors necessary to improve visibility. The latter are usually black, gold- or silver-colored pigments and the luminescent substance. The luminescent substances may be organic or inorganic, but they should expediently not be available commercially. The luminescent substance can be selected for example, so as to be visible not only to a machine but also to the human eye, e.g. having an emission in the IR and visible spectral ranges. The mixing ratio of color pigments and luminescent substances and their color constellation should be selected such that the excitation light and/or emission light of the luminescent substance are present in sufficient intensity or will not be excessively absorbed by the color pigments.

These layers of color and varnish can be fixed on the surface of the identity card e.g. with the aid of an adhesive layer 15 which is activated using heat and pressure. Another possibility is to use subtimable and/or migrating colors and luminescent substances which evaporate during hot embossing, for example, and penetrate into adjacent layers, in particular into the plastics material of a card.

A further embodiment of a transfer band is shown in FIG. 4. According to this variation, the luminescent substance and the color pigments form separate layers 16, 17, whereby layer 16 containing the luminescent substance is introduced between layer of varnish 13, which is later on the outside, and layer of color 17. Since the luminescent substance is not covered by color pigments here and is thus restricted in its emissive power, the amount of substance required can be considerably reduced and nevertheless a very visible or machine-detectable emission obtained. The transfer band technique also offers a simple possibility of applying luminescent substances that emit in different colors in any desired. e.g. an iridescent, pattern, if the transfer band is provided with a correspondingly designed luminescent layer. For example the pattern can be selected here in such a way that two partial areas of the surface relief appear luminescent in different colors and the two colors exist side by side in an area therebetween, so that a pure luminescent color runs into the other pure luminescent color continuously or via a secondary color. Furthermore, fine lines or large-area signets, for example, can be applied in one luminescent color over a different colored luminescent background, which are effective in suitable surface structures, e.g. fine screens.

The layer of varnish covering the luminescent substance may be e.g. a synthetic resin varnish hardenable under UV light, which is hardened after being transferred to the card and thus gives the card surface sufficient hardness. This protects the luminescent substance against mechanical stress, in particular abrasion, during the subsequent daily use of the card.

Application of the luminescent substance by the hot embossing method has in particular the advantage that it makes it possible to apply both the contrasting color and the luminescent substance in one operation, so that no additional procedural steps are required during card production. A further advantage of the hot embossing method is that this method can also be used for inking very fine structures, so that almost any relief structures can be provided with luminescent substance in the desired form.

Instead of this hot embossing method, other inking techniques known e.g. from the letterpress method can also be used. For example, the luminescent substances can be applied via a roller or similar means.

FIG. 5 shows a partial sectional view of an identity card provided with deep embossed characters 18. In the case of these characters, the luminescent substance and also the contrasting color are introduced into bottoms 19 of the relief structure. Here, too, the luminescent substance and the color can be applied in the same operation. For this purpose, an appropriately equipped ink ribbon is preferably introduced between the embossing die and the identity card during the embossing of the characters, and the color transferred and fixed usually by mechanical means. Since the luminescent substance exists here in a protected position, i.e. in these valley bottoms, one can generally dispense with an additional varnish cover, in particular a UV varnish cover. However, she luminescent substance can also be applied to back 20 of the card preferably by the above-mentioned hot embossing method, whereby a luminescent substance is appropriate here if it is transparent under nonactinic light. Since the characters appear in mirror writing when the luminescent substance is excited, this method is mainly suitable for machine testing.

The embossed characters can be tested and machine read in a simple way with sensors that respond to the luminescent light. By selecting suitable filters that make the sensors respond solely to the emission light, one obtains a reliable detection since the entire ambient light of other wavelength ranges is eliminated. This allows not only for the characters to be read in a simple manner but also for easy authenticity testing, since the reading device only responds when luminescent substances with the necessary emission properties are actually present.

The luminescence distribution on the card can be used not only for detecting characters as such and determining the user data, but also for obtaining an individual signal differing from card to card. As shown in FIG. 6, a sensor is used here, for example, whose scan area has the shape of rectangle 21. When this sensor is directed over data line 22 and the light received in the scan area recorded in the form of an intensity distribution, this results in a curve as shown basically by way of example in FIG. 7. The trace of the curve is determined by the shape of the characters, for instance, but also by manufacturing and process tolerances during application of the luminescent substance and by the scanning geometry of the sensor head. This analog signal can now be recorded directly on the card or else digitized, compressed and, preferably also in an encoded form, recorded into a storage medium of the card (magnetic track, electronic memory, etc.). During the subsequent use of the card, the data line is then scanned again in the same form and the scanned result compared with the one recorded before. Such methods of determining the authenticity of data carriers are known from German patent no. 28 58 266 or 28 29 778.

The inventive solution, i.e. to equip relief structures partly with luminescent substances, is not limited to high (deep) embossed data, but can also be used to protect any relieflike surface areas.

Such relief structures can e.g. also be randomly arising structures. Laminating plates which have been given a rough surface e.g. by sand blasting, transfer their surface roughness to the card surface. One can make this barely reproducible surface structure "visible" to a machine or to the human eye in the form of a luminescence image by applying luminescent substance to the raised areas, the spatial distribution of the relief peaks being a feature that clearly characterizes the particular structure. This relief structure is thus recognizable, and can be tested for changes, in an unambiguous and reproducible form. If this structure is scanned when the card is issued and the result stored on the card or in an authorization office, after possible processing of the data (digitization, reduction. encoding, linking with other card data and other information, etc.), this card can be checked in a simple way at a later time as to the specific surface structure and its intactness. Attempts to change inside card data by removing the cover layer of the card with mechanical, thermal or chemical means can thus be clearly recognized, since such attempts cannot be performed without destroying or changing the card surface and thus its relief structure.

FIG. 8 shows a portion of a card surface 30 in which protruding peak areas 31 of the surface structure are provided with luminescent substance 32. Although the luminescent substance is clearly shown, it can of course be invisible (transparent) at least under nonactinic light, so that the card has its commonly known appearance in its usual surroundings and the luminescence and thus the relief structure are only detectable by machine and-/or visually after excitation under IR light, UV light or other excitation sources.

The relief structure with an irregular, random character can—as already mentioned—be obtained by appropriately pretreated laminating plates or plate inserts, whereby the number of plates used for production constitutes a definite repeating rate. Cutting tolerances and selective interventions during triggering, etc., can reduce the probability of two or more "identical" cards coming about to a reasonable minimum.

The laminating plates and/or inserts which are introduced between the card and the actual laminating plate can be provided with any desired relief structures by mechanical methods (e.g. sand blasting), chemical methods (e.g. etching) and other known methods.

The relief structures can also be produced directly on the document, paper of value, card, etc., by the same or different means. In the same way structures can thus be provided in the outer surface e.g. using a random-controlled laser beam by melting, decomposition, evaporation of plastics or other materials. Similarly, one can locally foam foamable plastics materials, use appropriating printing techniques (steel intaglio printing, blinding techniques, etc.), vapor-metallize material, etc., to create structured surfaces which are then provided with a luminescent substance according to the invention. In particular due-to the random structure, the document then has an authenticity feature that is inimitable, or cannot be imitated by reasonable efforts.

Since the random structure itself already provides sufficient protection against forgery, one can use commercially available luminescent substances.

When evaluating the surface structure of an identity card, it is not necessary, as shown in FIG. 9, to scan the entire structured surface 33 of the card. It usually suffices to scan the card e.g. only along a track 34 or within an area 35, since a signal obtained therefrom already has sufficient "individuality." If one records on the data carrier in what area the relief structure is evaluated, one obtains further individualization that is not recognizable to an outsider and is selected anew from card to card or from test to test. In this way one can select very striking areas or take account of acceptable changes in the relief structure that exist from test to test (ageing).

The luminescent substance is preferably also applied only along this track 34. In the hot embossing method, one can determine the track width in a simple way by selecting the transfer band width accordingly, and also the placement of the track by the positioning of the band relative to the card.

Methods and suitable sensors for detecting luminescence by measurement techniques are known as such, in particular from the above-mentioned German patents nos. 28 29 778 and 28 58 266.

We claim:

1. A method of producing a document having depressed areas relative to the surface of the document and at least one luminescent substance in at least a partial area of the surface relief which allows easy testing of both the document and the data as to their authenticity and originality, wherein the luminescent substance is applied only to the depressed areas of the surface relief by preparing a multilayer transfer band containing a luminescent substance at least in one of the layers to be transferred, and transferring the luminescent substance to the depressed areas of the surface relief using pressure and temperature by the transfer method known as such.

2. The method of claim 1, characterized in that the document is made of plastics and the surface relief is produced by softening the plastics material of the document and embossing it with a laminating plate having a surface relief thereon, whereby the relief of the plate is embossed on the document.

3. The method of claim 2, characterized in that the surface relief is formed on the laminating plate by chemical methods.

4. The method of claim 1, characterized in that the surface relief is produced directly on the document by chemical methods.

5. The method of claim 1, characterized in that a transfer band is used which contains the luminescent substances in a mixture of one layer.

6. The method of claim 1, characterized in that the transfer band contains the luminescent, substances in a plurality of separate layers.

7. The method of claim 1, characterized in that the transfer band has a polymerizable layer of varnish which is hardened after the luminescent layer has been transferred to the document.

8. The method of claim 1, characterized in that the transfer band has a width and is positioned relative to the document during the transfer process in such a way that the luminescent substance is transferred to the document solely along a narrow strip.

9. The method of claim 1, characterized in that a transfer band is used which contains the luminescent substances and a visible color in a mixture in one layer.

10. The method of claim 2, wherein the surface relief is formed on the laminating plate by etching or sand blasting.

* * * * *